United States Patent
Tsodik et al.

(10) Patent No.: US 11,677,534 B2
(45) Date of Patent: Jun. 13, 2023

(54) DEVICE AND METHOD FOR FAST COLLISION RESOLUTION

(71) Applicant: Huawei Technologies Co., Ltd., Shenzhen (CN)

(72) Inventors: Genadiy Tsodik, Munich (DE); Shimon Shilo, Hod Hasharon (IL); Doron Ezri, Munich (DE); Avi Weitzman, Hod Hasharon (IL); Oren Hencinski, Munich (DE); Leonid Epstein, Munich (DE); Oded Redlich, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 17/144,955

(22) Filed: Jan. 8, 2021

(65) Prior Publication Data

US 2021/0135835 A1 May 6, 2021

Related U.S. Application Data

(63) Continuation of application No. PCT/EP2018/068556, filed on Jul. 9, 2018.

(51) Int. Cl.
*H04L 5/14* (2006.01)
*H04L 1/08* (2006.01)

(52) U.S. Cl.
CPC .............. *H04L 5/1438* (2013.01); *H04L 1/08* (2013.01)

(58) Field of Classification Search
CPC ................ H04L 5/1438; H04L 12/413; H04L 25/03006; H04L 5/0062; H04L 5/0073; H04L 25/0328
See application file for complete search history.

(56) References Cited

U.S. PATENT DOCUMENTS 10,334,614 B1 * 6/2019 Choi .................... H04L 5/0028
2005/0058151 A1 * 3/2005 Yeh ........................ H04W 52/46
370/445

(Continued)

FOREIGN PATENT DOCUMENTS

| CN | 105580479 A | 5/2016 |
| EP | 3133888 A1 | 2/2017 |
| WO | 2014124740 A1 | 8/2014 |

OTHER PUBLICATIONS

Tsodik et al., "Improving System Efficiency using Full Duplex Based Collision Detection," IEEE Draft, 11-18-1019-01-00FD, vol. 802.11 FD, No. 1, XP068126248, pp. 1-10 (May 2018).

(Continued)

*Primary Examiner* — Shukri Taha
(74) *Attorney, Agent, or Firm* — Leydig, Voit & Mayer, Ltd.

(57) ABSTRACT

A device resolves a collision between its transmission and a simultaneous transmission of another device. The device is configured to interrupt its transmission, determine a negotiation signal, and determine at least one available resource to occupy with the negotiation signal during a negotiation period. Further, the device is configured to transmit the negotiation signal on the at least one available resource and simultaneously receive a negotiation signal on another resource from at least one other device during the negotiation period. Then, the device is configured to decide, based on all negotiation signals, whether to retransmit the interrupted transmission after the negotiation period.

17 Claims, 10 Drawing Sheets

(56) References Cited

U.S. PATENT DOCUMENTS

2008/0144493 A1\* 6/2008 Yeh .................. H04W 74/0816
370/230
2022/0240256 A1\* 7/2022 Balasubramanian ........................
H04L 5/1461

OTHER PUBLICATIONS

Vishwanath et al., "802.11 Full Duplex," IEEE Draft, 11-18-0549-00-00FD, vol. 802.11 FD, XP068125588, pp. 1-20 (Mar. 6, 2018).
"Working Party 8F, Liaison Statement to Relevant External Organizations and Working Party 8A (Copy to Working Parties 4B and 8D)," Radiocommunication Study Groups, Document 4B/123-E, Document 8D/462-E, Source: Document 8F/TEMP/479(Rev.3), RP-070188, Total 74 pages, International Telecommunication Union, Geneva, Switzerland (Feb. 16, 2007).

\* cited by examiner

DEVICE AND METHOD FOR FAST COLLISION RESOLUTION

CROSS-REFERENCE TO RELATED APPLICATIONS

This application is a continuation of International Application No. PCT/EP2018/068556, filed on Jul. 9, 2018, the disclosure of which is hereby incorporated by reference in its entirety.

FIELD

The present disclosure relates to the technical field of wireless communications, especially Wi-Fi. The disclosure presents in particular a device for Full Duplex (FD) wireless communications, which is able to quickly resolve a collision it has with another device, by using its FD capabilities. Accordingly, the disclosure also relates to a method for collision detection and resolution based on FD. The method may be carried out in a system according to the disclosure, which includes multiple of the devices.

BACKGROUND

Most versions of IEEE 802.11 Wi-Fi standards adopt the Enhance Distributed Channel Access (EDCA) method to access the channel. One main drawback of this method is that it may cause collisions by two or more devices e.g. Stations (STAs), which start transmitting simultaneously.

Figure 8:
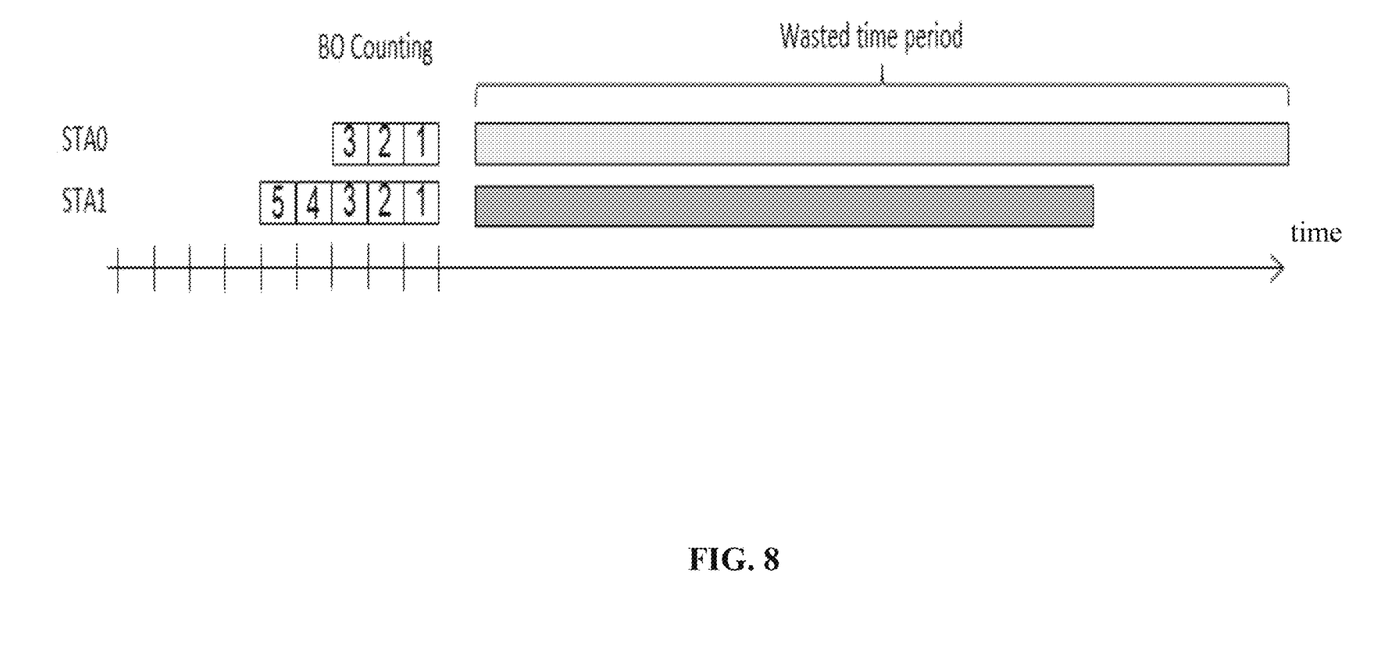
FIG. 8 shows collision in a regular EDCA based channel access.

FIG. 8 shows in this respect two STAs both using the EDCA method to access the medium. Each STA senses the medium and reduces an individual Backoff (BO) counter (by a slot), while the medium is free. When its counter reaches zero, a STA starts transmitting. However, when the counter of the two (or more) STAs reaches zero at the same time, the STAs start transmitting simultaneously, and hence a collision of the transmissions occurs. The colliding STAs cannot recognize that there is a collision, and as a consequence the transmission time will in most case be wasted, because the simultaneous transmissions cannot be decoded correctly at a receiver.

Many ideas have addressed this problem and have tried to solve it, mostly, by preventing collisions or at least by significantly reducing the probability of collisions.

Figure 9:
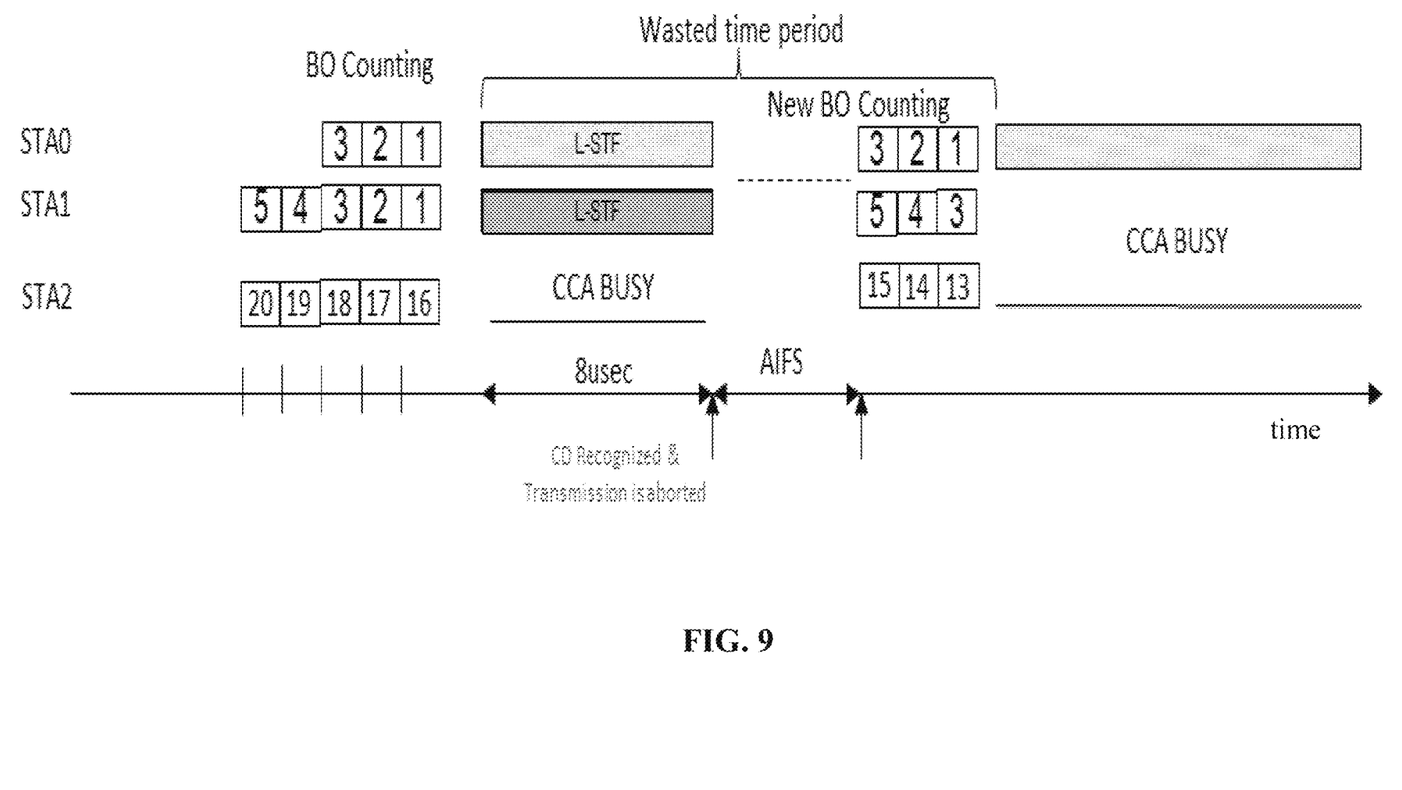
FIG. 9 shows an EDCA based collision resolution.

In principle, however, detecting and resolving the collision could also reduce the wasted time. In this case, a simple action for every device, which is able to detect a collision, could be to drop its ongoing transmission and to repeat its medium access with a newly generated Contention Window (CW) value. This is shown in FIG. 9. Other devices, which are not able to detect a collision, could detect an energy drop and could resume medium access after an Arbitration Inter-Frame Spacing (AIFS) interval. This could lead to an overall reduction of the wasted time period compared to the situation in FIG. 8.

However, this simple solution has also some disadvantages. The minimization of the wasted time period is still rather limited. Every device that did not decode the L-SIG field of one of the colliding transmissions will set and keep its Clear Channel Assessment (CCA) based on energy level, and may access the medium only after a duration as low as AIFS+1 slot. Furthermore, devices that have decoded the L-SIG field of one of the colliding transmissions will remain silent for a duration calculated from the L-SIG field. The collided devices are not given opportunity to resolve the collision between them. Moreover, applying a regular EDCA approach with a newly generated small CW value could lead to additional collisions.

Furthermore, devices e.g. STAs are currently not configured to detect collisions.

SUMMARY

In view of the above, the present disclosure solves the problem of collisions and improves the conventional solutions addressing this problem. The disclosure provided a device, or system of devices, for reliably detecting a collision and for quickly and efficiently recovering from the collision, i.e. for resolving the collision. The disclosure also provides a method for resolving a collision.

Figure 10:
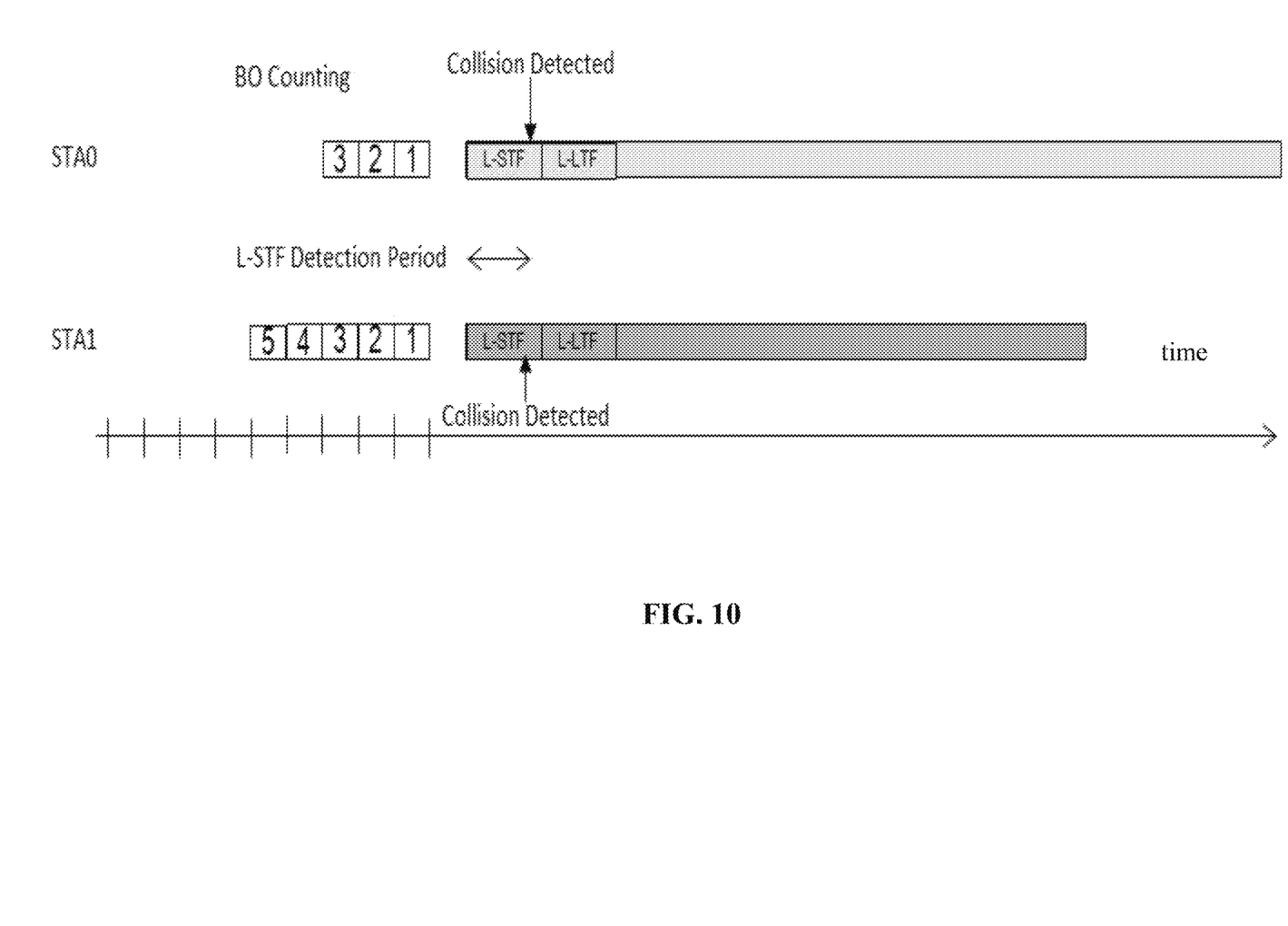
FIG. 10 shows an unsynchronized collision resolution scenario.

Embodiments of the present disclosure are based on FD technology as currently discussed in the IEEE 802.11 FD TIG. Devices, e.g. STAs, which support FD technology are able to recognize another transmission by listening while transmitting. As shown in FIG. 10, it can be assumed that the detection of the legacy fields Legacy Short Training Field (L-STF) and Legacy Long Training Field (L-LTF) is possible in presence of self-interference, regardless of the ability to detect the data portion. Thus, a benefit of the FD technology is the potential to detect collisions. Notably, conventional FD technology devices are not yet configured to recognize collisions.

The idea of the disclosure is to use the FD ability of the devices to recognize collisions, not to prevent or suppress them, and provide instead an efficient resolution procedure. Generally, if a collision is detected, a device of an embodiment of the disclosure drops its ongoing transmissions. The device then transmits and receives simultaneously special negotiation signals, which allow for deciding whether the device should retransmit its dropped transmission (or in a system of devices, which of the devices should retransmit its transmission). The decision may be based on randomly chosen numbers, which define an exact structure of the negotiation signal per device.

A first aspect of the disclosure provides a device for FD wireless communications, configured to, in case of a collision between a transmission of the device and a simultaneous transmission of at least one other device, interrupt the transmission, determine a negotiation signal, determine at least one available resource to occupy with the negotiation signal during a negotiation period, transmit the negotiation signal on the at least one available resource and simultaneously receive a negotiation signal on another resource from at least one other device during the negotiation period, and decide, based on all negotiation signals, whether to retransmit the interrupted transmission after the negotiation period.

Using the FD technology allows the device to perform fast collision resolution with a high probability. The required time overhead to achieve this high probability is very small compared to conventional implementations. There is thus no need to reduce the probability of collisions, and as a consequence, the EDCA approach can be applied with a small CW value. This also reduces the overhead of the waiting time. The disclosure can be based on already designed signals, and thus both transmitter and receiver do not require new algorithms or new hardware.

In an implementation form of the first aspect, the device is configured to wait, after interrupting the transmission, for a determined period of time while listening for transmissions from other devices, and transmit the negotiation signal after the determined period of time, if no transmission from another device was received during the determined period of time.

Thus, the device is able to wait whether one or more legacy devices, which do not drop their transmission because they cannot detect the collision, continues transmitting. In this case, the negotiation procedure may be aborted.

In a further implementation form of the first aspect, the device is configured to determine, as the at least one available resource, one or more time resources from a set of time resources available during the negotiation period.

In a further implementation form of the first aspect, the device is configured to select a unique bit sequence from a set of predefined bit sequences, and determine the one or more time resources according to the unique bit sequence.

In a further implementation form of the first aspect, the device is configured to associate each bit of the selected bit sequence with one time resource in the set of time resources available during the negotiation period, and transmit a replica of the negotiation signal in a time resource associated with a bit having a first logic value and not transmit a replica of the negotiation signal in a time resources associate with a bit having a second logic value.

In a further implementation form of the first aspect, the device is configured to determine whether, during a time resources associated with a bit having a second logic value, at least one other device transmits a negotiation signal, and abort transmitting replicas of the negotiation signal during the remaining negotiation period, if determined that at least one other device transmits a negotiation signal during said time resource.

In a further implementation form of the first aspect, the device is configured to retransmit the interrupted transmission after the negotiation period, if replicas of the negotiation signal were transmitted according to the entire bit sequence without abortion and if no other device also transmitted replicas of its negotiation signal according to its entire bit sequence without abortion.

In a further implementation form of the first aspect, the device is configured to, if at least one other device also transmitted replicas of its negotiation signal according to its entire bit sequence without abortion, repeat the negotiation procedure based on determining a new negotiation signal, or abort the negotiation procedure, if the negotiation procedure was already repeated for a predetermined number of times.

With the above implementation forms, a time-division based implementation of the solution to resolve the collisions is provided.

In a further implementation form of the first aspect, a negotiation signal is based on a STF signal.

This implementation form uses an existing signal and can thus be easily and efficiently implemented.

In a further implementation form of the first aspect, the device is configured to determine, as the at least one available resource, one or more frequency resources from a set of frequency resources available during the negotiation period.

In a further implementation form of the first aspect, the device is configured to determine the one or more frequency resources randomly or based on a predefined rule.

In a further implementation form of the first aspect, the device is configured to evaluate in which frequency resource a negotiation signal is received from the at least one other device.

In a further implementation form of the first aspect, the device is configured to retransmit the interrupted transmission after the negotiation period, if each of the one or more frequency resources determined as the at least one available resource is lower than each frequency resource in which a negotiation signal is received from at least one other device, or retransmit the interrupted transmission after the negotiation period, if each of the one or more frequency resources determined as the at least one available resource is higher than each frequency resource in which a negotiation signal is received from at least one other device.

With the above implementation forms, a frequency-division based implementation of the solution to resolve the collisions is provided.

In a further implementation form of the first aspect, a negotiation signal is based on a resource unit of a High-Efficiency LTF (HE-LTF) symbol.

This implementation form uses an existing symbol and can thus be easily and efficiently implemented.

A second aspect of the disclosure provides a system including devices for FD wireless communications according to the first aspect or any of its implementation forms, wherein in case of a collision between simultaneous transmissions of a plurality of the devices, each device is configured to interrupt its transmission, determine a negotiation signal, determine at least one available resource to occupy with the negotiation signal during a negotiation period, transmit the negotiation signal on the at least one available resource and simultaneously receive a negotiation signal from at least one other device during the negotiation period, and decide, based on all negotiation signals, whether to retransmit its interrupted transmission after the negotiation period.

In an implementation form of the second aspect, the plurality of devices are configured to jointly decide which one of the devices retransmits its transmission after the negotiation period.

The system including multiple devices of the first aspect can quickly and efficiently resolve collisions. The wait time is significantly reduced. The system benefits from all the advantages described above for the device of the first aspect.

A third aspect of the disclosure provides a method for a device for FD wireless communications, the method comprising, in case of a collision between a transmission of the device and a simultaneous transmission of at least one other device, interrupting the transmission, determining a negotiation signal, determining at least one available resource to occupy with the negotiation signal during a negotiation period, transmitting the negotiation signal on the at least one available resource and simultaneously receive a negotiation signal from at least one other device during the negotiation period, and deciding, based on all negotiation signals, whether to retransmit the interrupted transmission after the negotiation period.

In an implementation form of the third aspect, the method comprises waiting, after interrupting the transmission, for a determined period of time while listening for transmissions from other devices, and transmitting the negotiation signal after the determined period of time, if no transmission from another device was received during the determined period of time.

In a further implementation form of the third aspect, the method comprises determining, as the least one available resource, one or more time resources from a set of time resources available during the negotiation period.

In a further implementation form of the third aspect, the method comprises selecting a unique bit sequence from a set of predefined bit sequences, and determining the one or more time resources according to the unique bit sequence.

In a further implementation form of the third aspect, the method comprises associating each bit of the selected bit sequence with one time resource in the set of time resources available during the negotiation period, and transmitting a replica of the negotiation signal in a time resource associated with a bit having a first logic value and not transmit a replica of the negotiation signal in a time resources associate with a bit having a second logic value.

In a further implementation form of the third aspect, the method comprises determining whether, during a time resources associated with a bit having a second logic value, at least one other device transmits a negotiation signal, and aborting transmitting replicas of the negotiation signal during the remaining negotiation period, if determined that at least one other device transmits a negotiation signal during said time resource.

In a further implementation form of the third aspect, the method comprises retransmitting the interrupted transmission after the negotiation period, if replicas of the negotiation signal were transmitted according to the entire bit sequence without abortion and if no other device also transmitted replicas of its negotiation signal according to its entire bit sequence without abortion.

In a further implementation form of the third aspect, the method comprises, if at least one other device also transmitted replicas of its negotiation signal according to its entire bit sequence without abortion, repeating the negotiation procedure based on determining a new negotiation signal, or aborting the negotiation procedure, if the negotiation procedure was already repeated for a predetermined number of times.

In a further implementation form of the third aspect, a negotiation signal is based on a STF signal.

In a further implementation form of the third aspect, the method comprises determining, as the at least one available resource, one or more frequency resources from a set of frequency resources available during the negotiation period.

In a further implementation form of the third aspect, the method comprises determining the one or more frequency resources randomly or based on a predefined rule.

In a further implementation form of the third aspect, the method comprises evaluating in which frequency resource a negotiation signal is received from the at least one other device.

In a further implementation form of the third aspect, the method comprises retransmitting the interrupted transmission after the negotiation period, if each of the one or more frequency resources determined as the at least one available resource is lower than each frequency resource in which a negotiation signal is received from at least one other device, or retransmitting the interrupted transmission after the negotiation period, if each of the one or more frequency resources determined as the at least one available resource is higher than each frequency resource in which a negotiation signal is received from at least one other device.

In a further implementation form of the third aspect, a negotiation signal is based on a resource unit of a HE-LTF symbol.

The method of the third aspect and its implementation forms achieve the same advantages and effects as the device of the first aspect and its respective implementation forms.

All devices, elements, units and means described in the present application could be implemented in the software or hardware elements or any kind of combination thereof. All steps that are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present disclosure will be explained in the following description of exemplary embodiments in relation to the enclosed drawings, in which.

DETAILED DESCRIPTION

Figure 1:
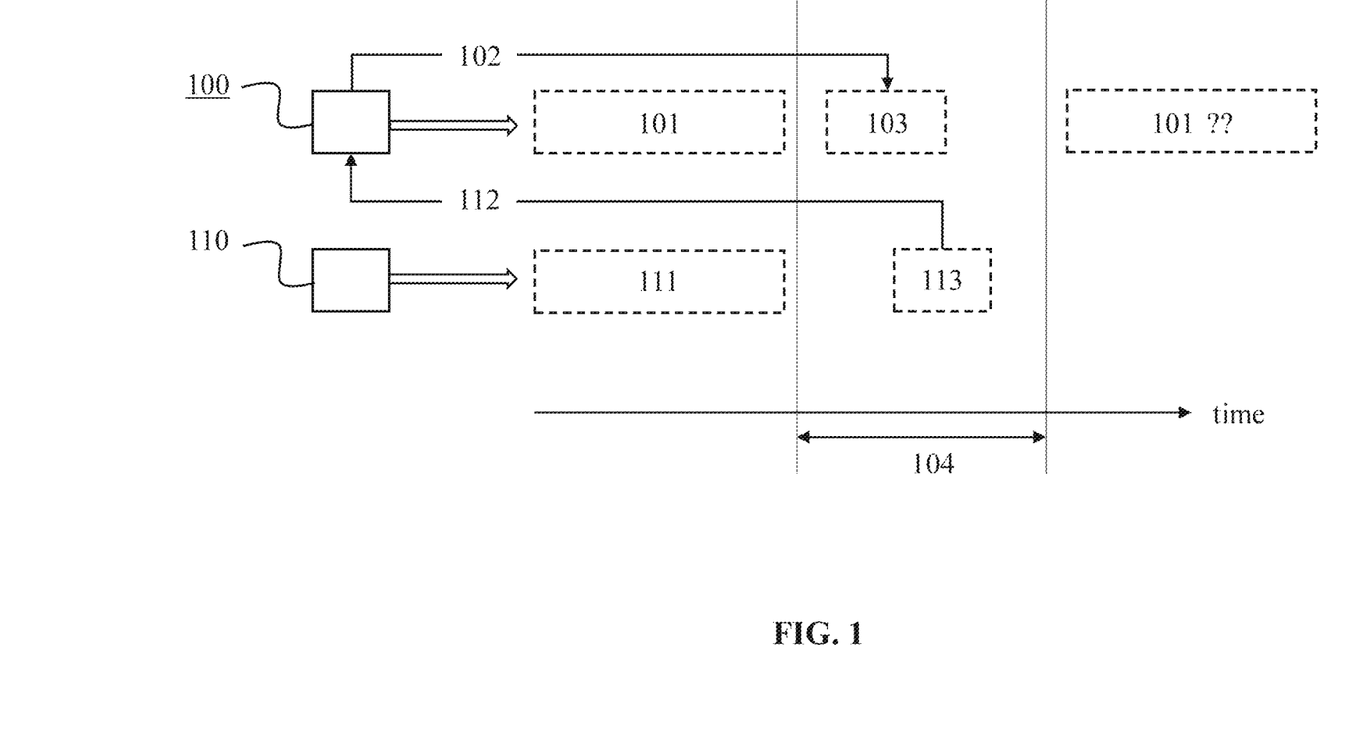
FIG. 1 shows a device according to an embodiment of the disclosure in a system.

FIG. 1 shows a device 100 according to an embodiment of the disclosure, wherein the device 100 is configured to perform FD wireless communications. FIG. 1 shows the device 100 in a system with another device 110. The other device 110 may be configured like the device 100, i.e. it may be capable of performing the same procedure for supporting collision resolution that is described below for the device 100. The system may also include multiple of other devices 110.

FIG. 1 illustrates a negotiation procedure carried out by the device 100 in case of a collision between a transmission 101 of the device 100 and a simultaneous transmission 111 of the other device 110. The collision may happen due to the EDCA approach as explained above with respect to FIG. 8. The collision may be detected by the device 100, particularly due to the FD capabilities of the device, i.e. because the device 100 is able to transmit and receive transmissions at the same time.

The device 100 is configured, in case of a collision, to interrupt its transmission 101. That is, the device 100 may drop its transmission 101. Then, the device 100 is configured to determine a negotiation signal 102, for instance, randomly or by some predefined mechanism (described later), and to determine at least one available resource 103 to occupy with the negotiation signal 102 during a negotiation period 104. The negotiation period 104 is a period of time that starts after the interruption of the transmission 101 (but not necessarily immediately after the interruption, i.e. there can be a waiting time as explained later). The device 100 may be a STA, and likewise the other device 110 may be a STA as well.

Further, the device 100 is configured to transmit the negotiation signal 102 on the at least one available resource 103 and simultaneously receive a negotiation signal 112 on another resource 113 from at least one other device 110 during the negotiation period 104. This is possible by the device 100 using FD technology. The device 100 may then decide, based on all negotiation signals 102, 112, i.e. its own transmitted negotiation signal 102 and possibly received negotiation signals 112 from other devices 110, whether to retransmit the interrupted transmission 101 after the negotiation period 104, or not.

The main purpose of the negotiation period 104 is that in a system of a plurality of devices 100, 110 (in FIG. 2 two STAs, STA0, and STA1, are shown, both with the capabilities described above for the device 100 shown in FIG. 1), several or all devices 100, 110 can simultaneously transmit a negotiation signal 102, 112 each. Evaluating the negotiation signals 102, 112 then allows taking a decision on which device 100, 110 "wins" the resolution (negotiation) procedure, and should thus continue its initial transmission 101, 111 after the negotiation period 104.

Figure 2:
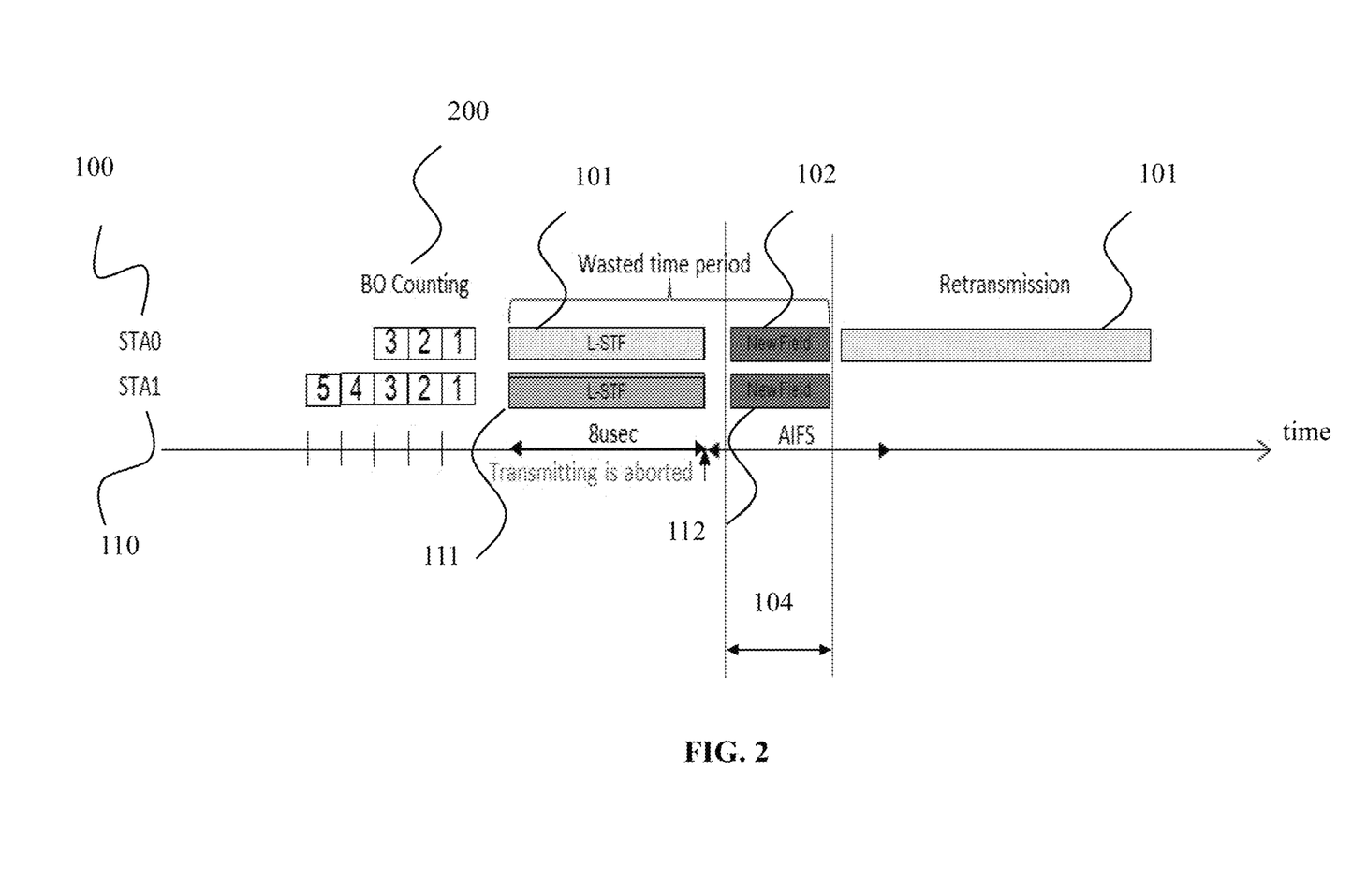
FIG. 2 shows two devices according to an embodiment of the disclosure in a system.

As shown in FIG. 2, the negotiation period 104 may be implemented by introducing a new field, particularly a short field, which is used by the devices 100, 110 for sending the negotiation signals 102, 112. Based on the negotiation signals 102, 112, the devices 100 and 110 then decide, which device 100, 110 retransmits its transmission 101, 111 after the negotiation period 104. In FIG. 2, the device 100 (i.e. STA0) is determined to retransmit the initial transmission 101.

FIG. 2 also shows that each device 100, 110 may use the EDCA method to access the medium. That is, both devices 100, 110 may sense the medium and reduce an individual BO counter 200 until it reaches zero. FIG. 2 shows particularly the case of a collision between the transmission 101 of device 100 and the transmission 111 of device 110, i.e. both transmissions 101, 111 occur at the same time. When such a collision is detected, e.g. by means of the FD capabilities of one or both devices 100, 110, each device 100, 110 may abort its transmission and use the negotiation period 104 to exchange the negotiation signals 102, 112. It can be derived from FIG. 2 that due to the negotiation procedure, the wasted time period is much less than in the conventional case (shown e.g. in FIG. 8 or FIG. 9).

Two main implementations can be used for exchanging the negotiation signals 102, 112, during the negotiation period 104. The procedures are described from the perspective of device 100, but may likewise be carried out by the other device 110 in the system.

A time-division based procedure (shown in FIG. 3): in this case device 100 may determine, as the least one available resource 103 during the negotiation period 104, one or more time resources 303 from a set of available time resources 303, 313. The device 100 may then transmit the negotiation signals 102 in the one or more time resources 303, for example, according to a special bit sequence chosen from a predefined bank. For every set of sequences there may be only one sequence which leads to a "victory".

A frequency-division based procedure (shown in FIG. 4): in this case the device 100 determines, as the at least one available resource 103 during the negotiation period 104, one or more frequency resources 403 from a set of available frequency resources 403, 413. The device 100 may then transmit the negotiation signal 102 on the determined frequency resources 303. Each device 100, 110 in the system can transmit only on a single (e.g. randomly) subset of frequencies 403, 413. Only a single subset of frequencies 403, 413 will lead to a "victory" according to some predefined rule.

In the following, the time-division based procedure is described in more detail with respect to FIG. 3. The procedure bases on a repetitive transmission by each of the devices 100, 110 in the system of replicas of its negotiation signal 102, 112. Each device 100, 110 may choose a sequence of N bits, and may then transmit replicas of its negotiation signal 102, 112 during N time slots. In each slot a single replica should be transmitted or skipped according to a current bit value of the bit sequence. For instance, each device 100, 110 may be configured to select a unique bit sequence from a set of predefined bit sequences, and to determine the one or more time resources 303 according to the unique bit sequence. In particular, each bit of the selected bit sequence can be associated with one time resource 303 in the set of time resources 303, 313 available during the negotiation period 104. A replica of the negotiation signal 102, 112 can then, for instance, be transmitted in a time resource 303 associated with a bit having a first logic value ("1" or "0") and not transmit a replica of the negotiation signal 101, 112 in a time resources 303 associate with a bit having a second logic value ("0" or "1").

A device 100, 110 that skips a replica according to the selected bit sequence, and recognizes that there is at least one other device 100, 110 transmitting in the time resource 303 skipped, quits the negotiation procedure and transmit no more replicas for the remaining negotiation period 104. A device 100, 110 that transmits last, while all other device 100, 110 are silent, "wins" the negotiation procedure, and thus continues the initial data transmission 101, 111 after the negotiation period 104.

Figure 3:
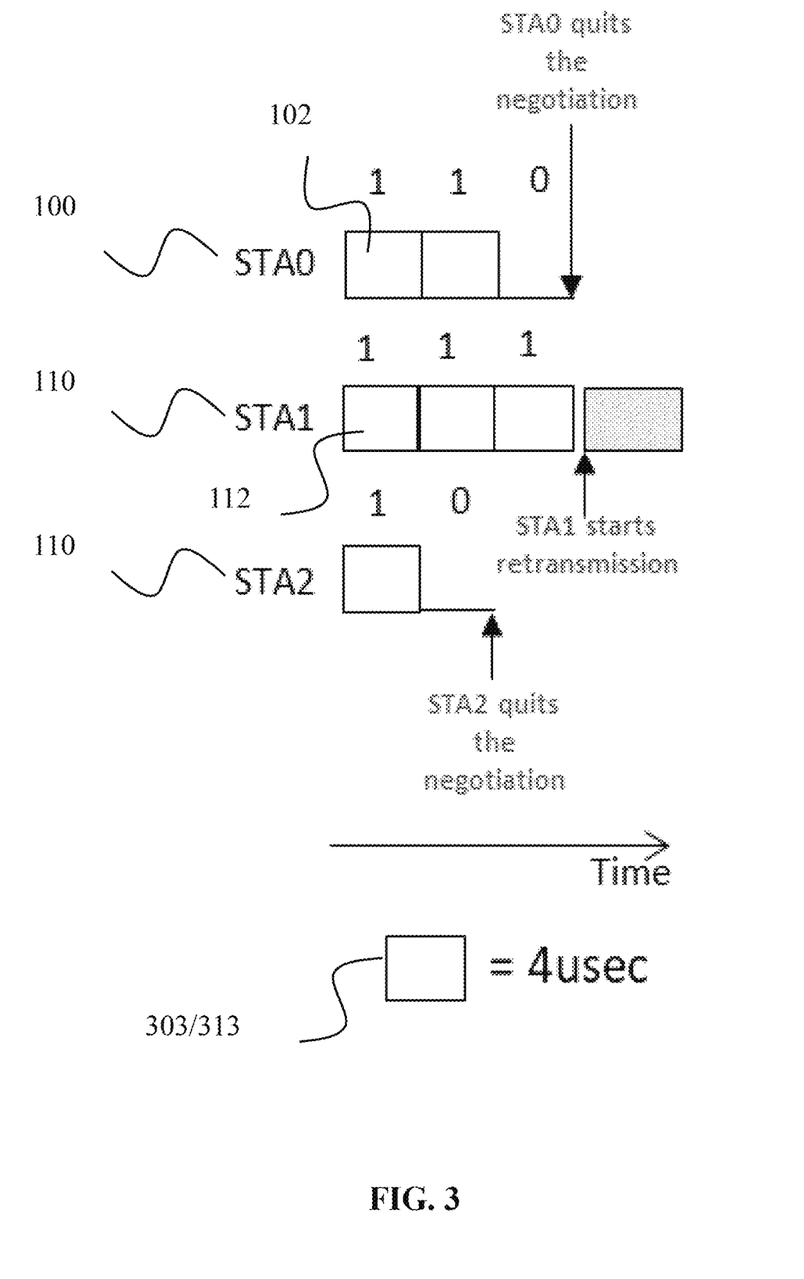
FIG. 3 shows a time-based collision resolution of devices according to an embodiment of the disclosure in a system.

An example of three STAs (labelled devices 100, 110) is shown in FIG. 3. In the example, STA2 recognizes at the second time resource 303, 313 (i.e. time slot of e.g. 4 µs) that it should quit the negotiation procedure. At the third time resource 303, 313 only STA0 and STA1 continue, before then STA1 recognizes that no other devices transmits in parallel with it. Thus, STA1 will continue transmitting its original data transmission 111 after the negotiation period 104.

A possible implementation for a format of the negotiation period 104 is to use an existing STF signal, which may be constructed of 10 repetitions of 0.8 µs replica. Thus, each replica of the Short Field Signal can consist of multiple replicas of STF. For example, in FIG. 3 a single Short Field replica of 4µ of 5 STF replicas can be combined.

Figure 4:
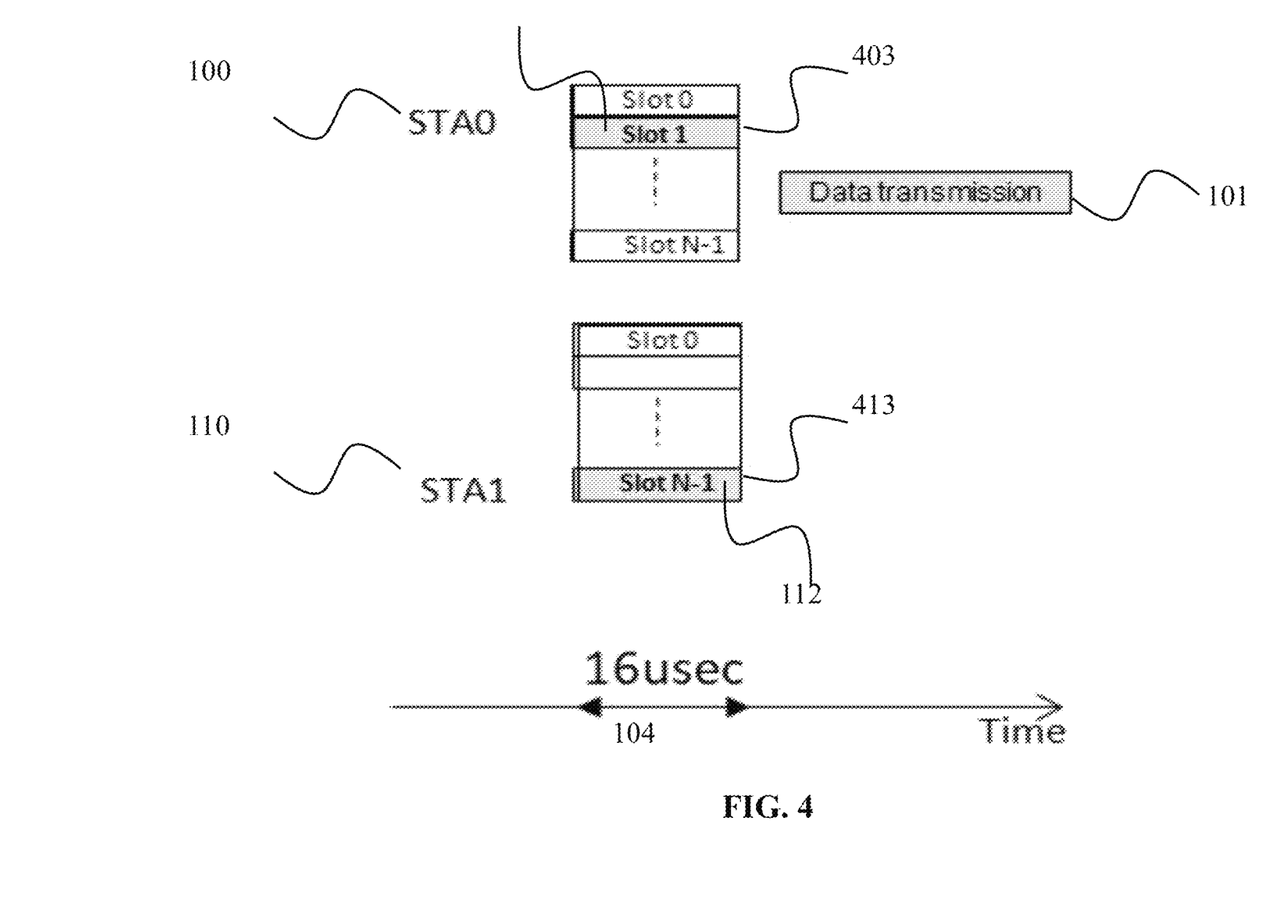
FIG. 4 shows a frequency-based collision resolution of devices according to an embodiment of the disclosure in a system.

In the following, the frequency-division based procedure is described in more detail with respect to FIG. 4. An alternative to perform the negotiation procedure is to divide an available frequency bandwidth to frequency resources 403, 413 (e.g. subbands) or sets of frequency resources 403, 414 and allow each device 100, 110 to choose randomly (or according to some predefined rule, e.g. using part of device ID) to transmit within a specific frequency resource or resource set. Every device 100, 110 may then detect the transmissions 101, 111 of other devices on the other frequency resources 403, 413 and the device 100, 110 that transmitted, for example, on the lowest (or highest) frequency resource 403 will continue its original transmission 101, 111 after the negotiation period 104.

A possible implementation for a format of the negotiation period 104 is to use a single HE-LTF symbol, where each resource unit (as defined in 802.11ax standard) can be occupied by a device 100, 110 with certain bits in station ID.

Further, a support for legacy devices (e.g. older STAs) is now described. The disclosure aims at providing a most reliable procedure, where the collision can be resolved or managed for every type of device involved. Thus, in order to make sure that the devices 100, 110 that have capability of the present disclosure are treated properly, the following algorithm (described with respect to FIG. 5 and FIG. 6) is proposed:

Apply an L-STF correlator while transmitting (in FD mode).

If a collision is detected, stop transmitting after completing a transmission of an own L-STF (8 µs).

Listen for a short period of time 500 (e.g. 4 µs).

If all the colliding transmissions are dropped, (because each device 100, 110 is able to detect collisions) start fast contention resolution according to the scheme of the disclosure as described above (see FIG. 5).

Otherwise, if not all colliding transmissions are dropped (e.g. because one other device 600 is a legacy STA or does not support FD to detect collisions), continue to decode a signal. That is, abort the negotiation procedure (see FIG. 6).

Figure 5:
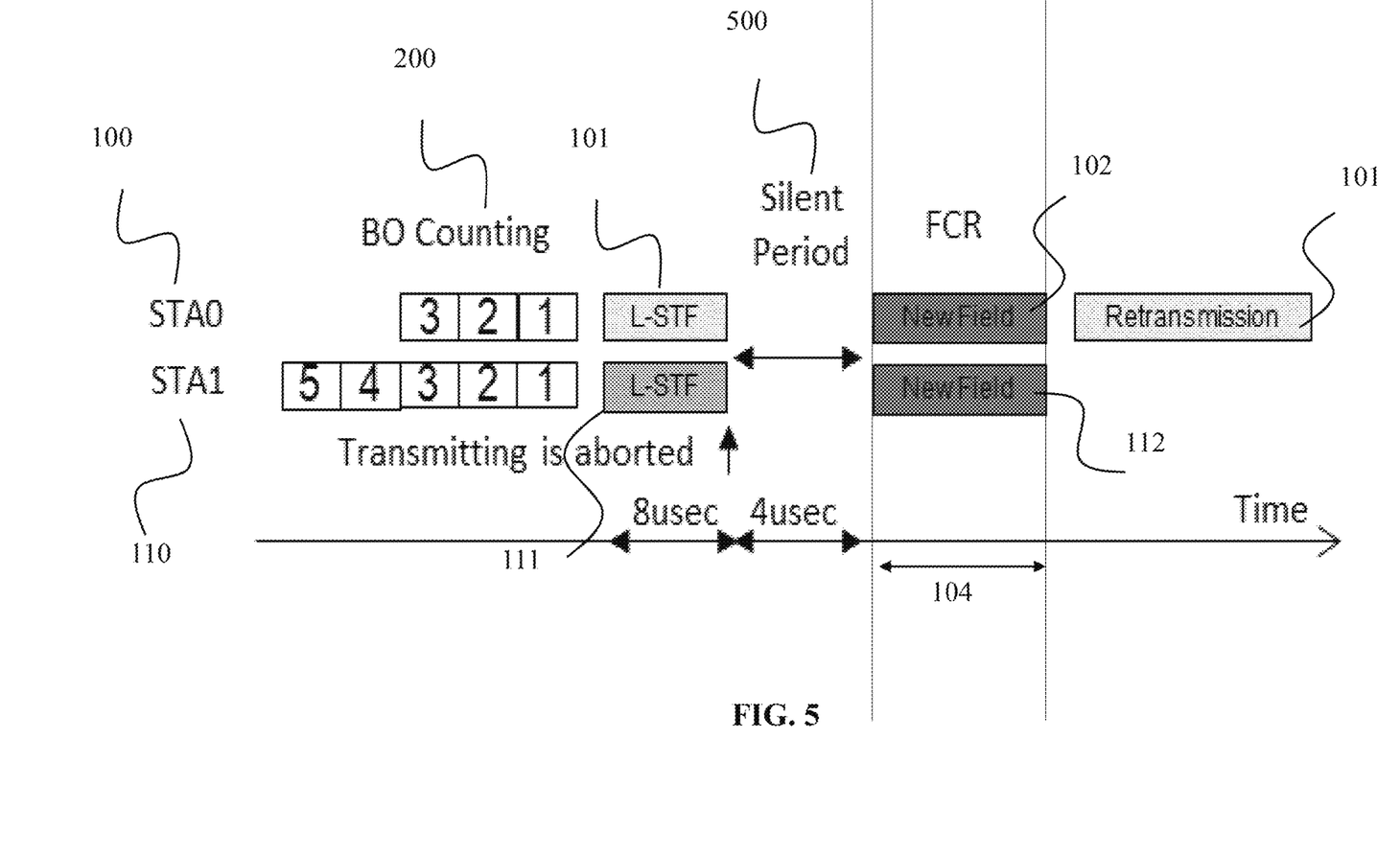
FIG. 5 shows two devices according to an embodiment of the disclosure in a system.
Figure 6:
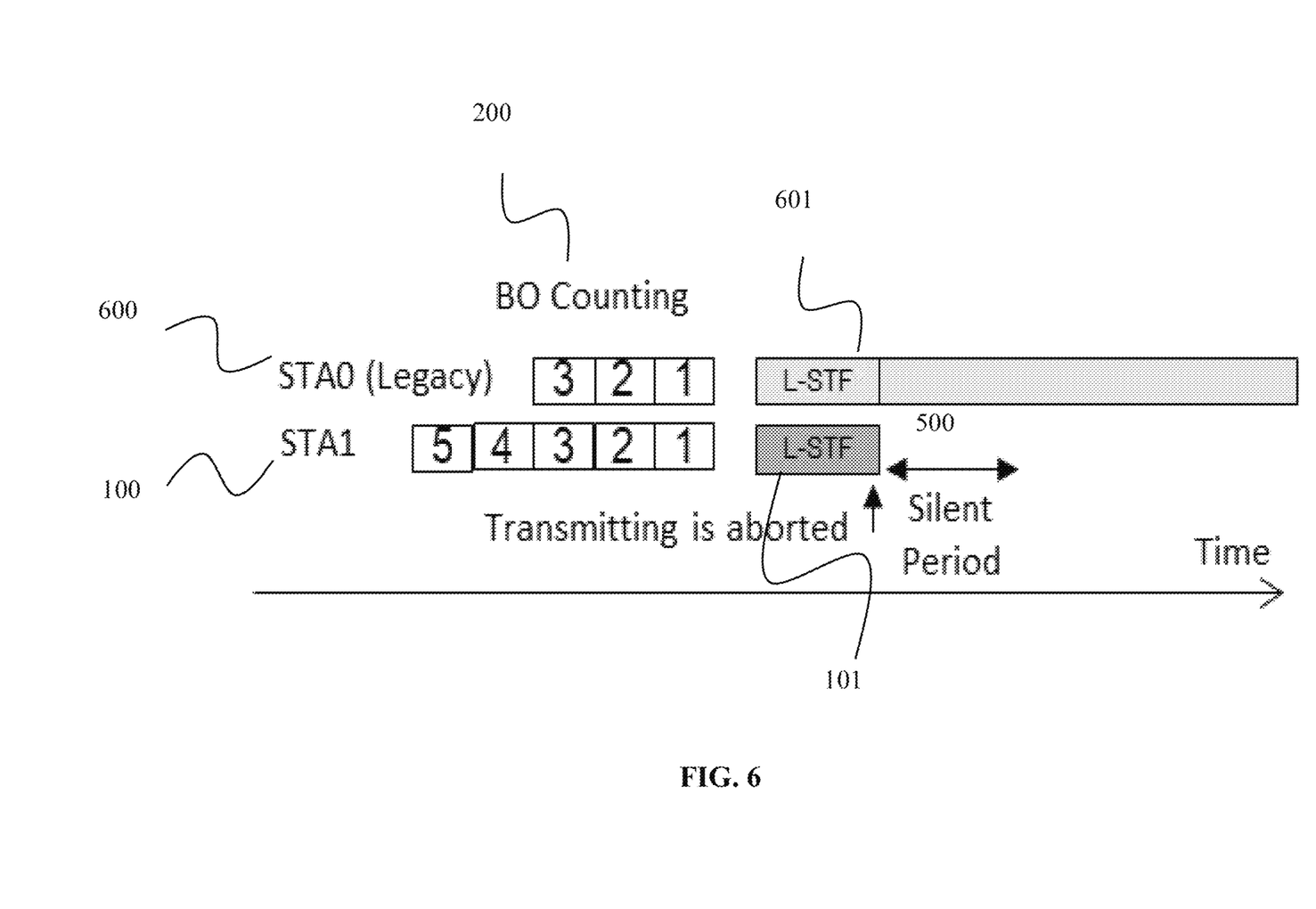
FIG. 6 shows a device according to an embodiment of the disclosure and a legacy device in a system.

In other words, the device 100 may be configured to wait, after interrupting the transmission 101, for a determined period of time 500 while listening for transmissions 111 from other devices 110, and transmit the negotiation signal 102 after the determined period of time 500, if no transmission 111 from another device 110 was received during the determined period of time 500.

Figure 7:
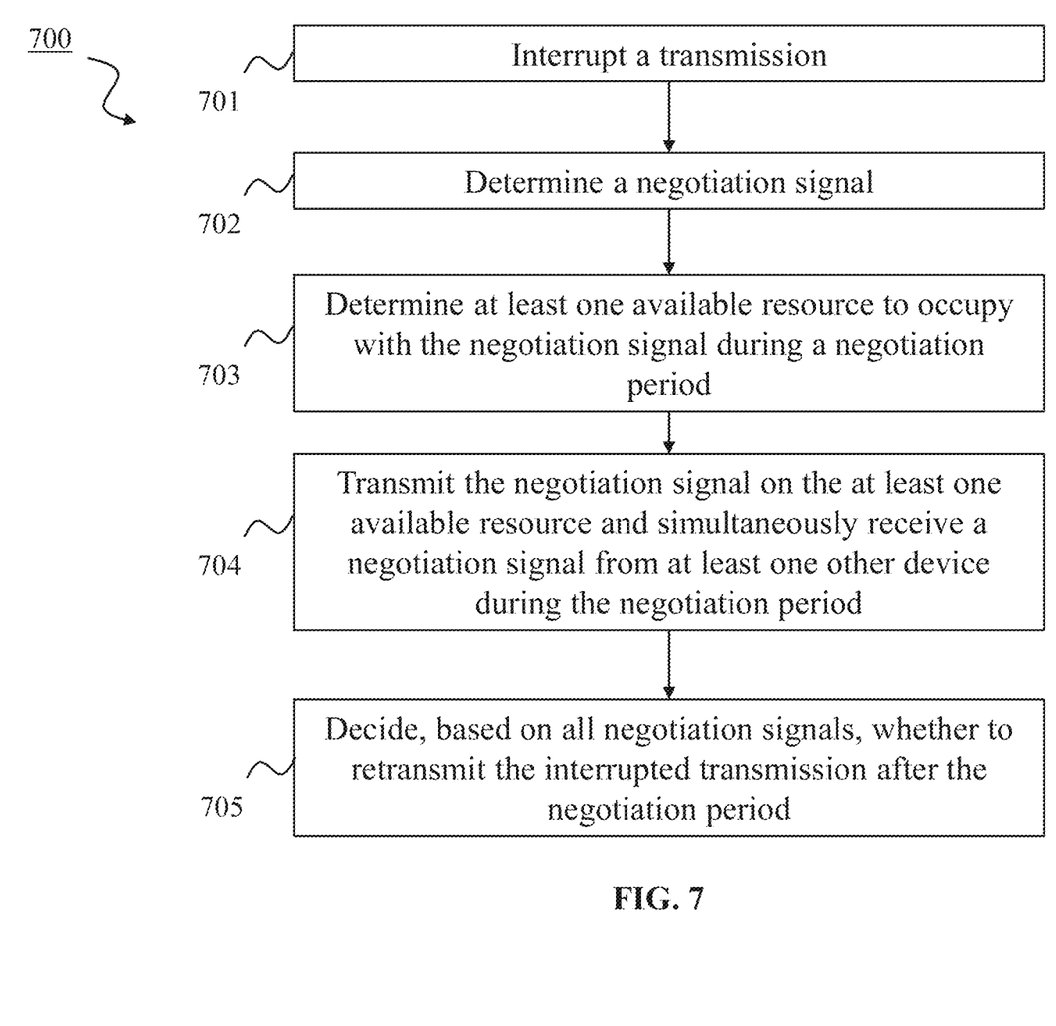
FIG. 7 shows a method according to an embodiment of the disclosure.

FIG. 7 shows a method 700 according to an embodiment of the disclosure. The method 700 is particularly for a device for FD wireless communications, e.g. can be carried out by the device 100 or 110 of FIG. 1. The method 700 comprises, in case of a collision between a transmission 101 of the device 110 and a simultaneous transmission 111 of at least one other device 110: a step 701 of interrupting the transmission 101, a step 702 of determining a negotiation signal 104, a step 703 of determining at least one available resource 103 to occupy with the negotiation signal 102 during a negotiation period 104, a step 704 of transmitting the negotiation signal 102 on the at least one available resource 103 and simultaneously receive a negotiation signal 112 from at least one other device 110 during the negotiation period 104, and a step 705 of deciding, based on all negotiation signals 102, 112, whether to retransmit the interrupted transmission 101 after the negotiation period 104.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for full duplex (FD) wireless communications, the device being configured to, in case of a collision between a transmission of the device and a simultaneous transmission of at least one other device:

interrupt the transmission, determine a negotiation signal, determine at least one available resource to occupy with the negotiation signal during a negotiation period, transmit the negotiation signal on the at least one available resource and simultaneously receive another negotiation signal on another resource from the at least one other device during the negotiation period, and decide, based on all negotiation signals, which comprises the negotiation signal and the another negotiation signal, whether to retransmit the interrupted transmission after the negotiation period.

2. The device according to claim 1, the device being configured to:

wait, after interrupting the transmission, for a determined period of time while listening for transmissions from the at least one other device, and transmit the negotiation signal after the determined period of time and based upon determining that no transmission from the at least one other device was received during the determined period of time.

3. The device according to claim 1, the device being configured to:

determine, as the least one available resource, one or more time resources from a set of time resources available during the negotiation period.

4. The device according to claim 3, the device being configured to:

select a unique bit sequence from a set of predefined bit sequences, and determine the one or more time resources according to the unique bit sequence.

5. The device according to claim 4, the device being configured to:

associate each bit of the selected bit sequence with one time resource in the set of time resources available during the negotiation period, and transmit a replica of the negotiation signal in a time resource associated with a bit having a first logic value and not transmit the replica of the negotiation signal in time resources associated with a bit having a second logic value.

6. The device according to claim 5, the device being configured to:

determine whether, during the time resources associated with the bit having the second logic value, the at least one other device transmits the another negotiation signal, and abort transmitting replicas of the negotiation signal during the remaining negotiation period, if determined that at least one other device transmits a negotiation signal during said time resource.

7. The device according to claim 6, configured to retransmit the interrupted transmission after the negotiation period, based upon determining that the replicas of the negotiation signal were transmitted according to the entire bit sequence without abortion and based upon determining that no other device also transmitted replicas of its negotiation signal according to its entire bit sequence without abortion.

8. The device according to claim 7, the device being configured to, based upon determining the at least one other device also transmitted replicas of its negotiation signal according to its entire bit sequence without abortion:

repeat the negotiation procedure based on determining anew negotiation signal, or abort the negotiation procedure, based upon determining the negotiation procedure was already repeated for a predetermined number of times.

9. The device according to claim 3, wherein:
the negotiation signal is based on a short training field (STF) signal.

10. The device according to claim 1, the device being configured to:
determine, as the at least one available resource, one or more frequency resources from a set of frequency resources (available during the negotiation period.

11. The device according to claim 10, the device being configured to:
determine the one or more frequency resources randomly or based on a predefined rule.

12. The device according to claim 10, the device being configured to:
evaluate in which of the frequency resources the another negotiation signal is received from the at least one other device.

13. The device according to claim 12, the device being configured to:
retransmit the interrupted transmission after the negotiation period, based upon determining that each of the one or more frequency resources determined as the at least one available resource is lower than each frequency resource in which the another negotiation signal is received from the at least one other device, or
retransmit the interrupted transmission after the negotiation period, based upon determining that each of the one or more frequency resources determined as the at least one available resource is higher than each frequency resource in which the another negotiation signal is received from the at least one other device.

14. The device according to claim 10, wherein the negotiation signal is based on a resource unit of a high-efficiency long training field (HE-LTF) symbol.

15. A system comprising a plurality of devices for full duplex (FD) wireless communications, each of the devices being configured to, in case of a collision between simultaneous transmissions of the plurality of the devices:
interrupt an associated transmission, of the transmissions, determine a negotiation signal,
determine at least one available resource to occupy with the negotiation signal during a negotiation period,
transmit the negotiation signal on the at least one available resource and simultaneously receive another negotiation signal from at least one other of the devices during the negotiation period, and
decide, based on all negotiation signals, comprising the negotiation signal and the another negotiation signal, whether to retransmit the associated interrupted transmission after the negotiation period.

16. The system according to claim 15, wherein
the plurality of devices are configured to jointly decide which one of the devices retransmits the associated transmission after the negotiation period.

17. A method for operating a device for full duplex (FD) wireless communications, the method comprising:
detecting a collision between a transmission of the device and a simultaneous transmission of at least one other device;
interrupting the transmission;
determining a negotiation signal;
determining at least one available resource to occupy with the negotiation signal during a negotiation period;
transmitting the negotiation signal on the at least one available resource and simultaneously receiving another negotiation signal from the at least one other device during the negotiation period; and
deciding, based on all negotiation signals, which comprise the negotiation signal and the another negotiation signal, whether to retransmit the interrupted transmission after the negotiation period.

* * * * *

UNITED STATES PATENT AND TRADEMARK OFFICE
CERTIFICATE OF CORRECTION

PATENT NO. : 11,677,534 B2
APPLICATION NO. : 17/144955
DATED : June 13, 2023
INVENTOR(S) : Tsodik et al.

It is certified that error appears in the above-identified patent and that said Letters Patent is hereby corrected as shown below:

In the Claims

Claim 8: Column 10, Line 67: "anew negotiation signal, or" should read -- a new negotiation signal, or --.

Signed and Sealed this
Tenth Day of October, 2023

Katherine Kelly Vidal
*Director of the United States Patent and Trademark Office*